(12) United States Patent
Cho et al.

(10) Patent No.: US 8,116,799 B2
(45) Date of Patent: Feb. 14, 2012

(54) METHOD AND SYSTEM FOR CONTROLLING POWER IN A COMMUNICATION SYSTEM

(75) Inventors: Jae-Hee Cho, Seoul (KR); Kwan-Hee Roh, Hwaseong-si (KR); Soon-Young Yoon, Seoul (KR); Kyung-Joo Suh, Seoul (KR); In-Seok Hwang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 907 days.

(21) Appl. No.: 11/756,818

(22) Filed: Jun. 1, 2007

(65) Prior Publication Data

US 2007/0280183 A1    Dec. 6, 2007

(30) Foreign Application Priority Data

Jun. 2, 2006  (KR) .................. 10-2006-0049799

(51) Int. Cl.
| | |
|---|---|
| H04B 7/185 | (2006.01) |
| H04B 17/00 | (2006.01) |
| H04B 7/00 | (2006.01) |
| H04B 1/18 | (2006.01) |
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 455/522; 455/67.11; 455/67.13; 455/69; 455/430; 455/214; 455/150.1; 370/318; 370/235; 370/252; 370/465; 370/253; 370/333; 370/338; 370/545

(58) Field of Classification Search .................. 455/522, 455/67.11, 67.13, 69, 430, 214, 150.1; 370/318, 370/235, 252, 465, 253, 333, 338, 545
See application file for complete search history.

(56) References Cited

U.S. PATENT DOCUMENTS

| | | | |
|---|---|---|---|
| 7,565,150 B1 * | 7/2009 | Beamish et al. ............... 455/450 |
| 7,593,339 B2 * | 9/2009 | Shoemake et al. ............ 370/235 |
| 2005/0090261 A1 * | 4/2005 | Agin ............................. 455/442 |
| 2006/0264180 A1 * | 11/2006 | Qiu ................................ 455/69 |
| 2007/0082620 A1 * | 4/2007 | Zhang et al. .................... 455/69 |
| 2008/0253389 A1 * | 10/2008 | Larsson ........................ 370/441 |
| 2008/0304584 A1 * | 12/2008 | Nishio et al. .................. 375/260 |

(Continued)

FOREIGN PATENT DOCUMENTS

KR    10-2003-0069299 A    8/2003

(Continued)

Primary Examiner — Temesgh Ghebretinsae
Assistant Examiner — Bobbak Safaipour
(74) Attorney, Agent, or Firm — Jefferson IP Law, LLP

(57) ABSTRACT

A method for controlling power in a communication system is disclosed. The power control method includes the steps of calculating a first offset according to traffic information of a mobile station and data transmission channel quality information of the mobile station, determining a second offset according to received channel quality information of the mobile station, received from the mobile station, determining a third offset according to interference information received from other base stations neighboring the base station, and transmitting, to the mobile station, power control information determined based on the first offset, the second offset and the third offset.

38 Claims, 3 Drawing Sheets

U.S. PATENT DOCUMENTS

| | | | |
|---|---|---|---|
| 2009/0005101 A1* | 1/2009 | Matsumoto et al. | 455/522 |
| 2009/0010211 A1* | 1/2009 | Sumasu et al. | 370/329 |
| 2009/0061767 A1* | 3/2009 | Horiuchi et al. | 455/18 |
| 2009/0104908 A1* | 4/2009 | Matsumoto et al. | 455/436 |
| 2009/0170549 A1* | 7/2009 | Lee et al. | 455/522 |
| 2009/0285169 A1* | 11/2009 | Yang et al. | 370/329 |
| 2009/0325627 A1* | 12/2009 | Lee | 455/522 |
| 2010/0002600 A1* | 1/2010 | Jiang et al. | 370/252 |

FOREIGN PATENT DOCUMENTS

| | | |
|---|---|---|
| WO | 2006/007318 A1 | 1/2006 |

\* cited by examiner

METHOD AND SYSTEM FOR CONTROLLING POWER IN A COMMUNICATION SYSTEM

PRIORITY

This application claims the benefit under 35 U.S.C. §119 (a) of a Korean patent application filed in the Korean Intellectual Property Office on Jun. 2, 2006 and assigned Serial No. 2006-49799, the entire disclosure of which is hereby incorporated by reference.

BACKGROUND OF THE INVENTION

1. Field of the Invention

The present invention relates generally to a communication system. More particularly, the present invention relates to a method and system for controlling transmission power in an uplink of a communication system.

2. Description of the Related Art

Extensive research on the next generation communication system is being conducted to provide users with high-speed services having various Quality of Service (QoS) levels. Particularly, to increase data transmission capacity and improve QoS, the communication system controls transmission power in a downlink and an uplink such that a Base Station (BS) or a Mobile Station (MS) can have a Signal-to-Interference Ratio (SIR) necessary for data reception while using the minimum signal strength. By controlling transmission power in this manner, the communication system allows an MS having a low SIR to have higher transmission power in a service area where it can receive a communication service from the BS, thereby stably exchanging data with the BS. By doing so, the communication system improves QoS and prevents the MS from transmitting signals with unnecessarily high power, thereby reducing QoS degradation of an MS that uses the same frequency band and receives communication service from a neighboring BS.

This power control scheme controls transmission power of a transmitter such that when a receiver receives a transmission signal transmitted by a BS or an MS, the receiver can maintain its required SIR.

In particular, a communication system employing Orthogonal Frequency Division Multiplexing (OFDM)/Orthogonal Frequency Division Multiple Access (OFDMA) increases, as described above, the transmission power of signals within the area where no interference occurs between neighboring BSs, for example, within the area where the data being exchanged between neighboring BSs and MSs that receive communication services from the neighboring BSs do not act as an interference signal, thereby improving quality, i.e., QoS, of received signals. Therefore, the communication system needs to apply different power control conditions to an MS that has a high channel quality (i.e., an MS that is located in the center area of a BS in charge of a particular cell), and another MS that has a low channel quality (i.e., an MS that is located in the boundary area of the BS).

For example, when an MS located in the boundary area of a BS increases transmission power of its transmission signals for data exchange with the BS in charge of the cell where it is located, the MS induces an interference signal which is higher in strength by the transmission power, to a neighboring BS in charge of a cell neighboring the cell where it is currently located. Therefore, the BS allows the receiver, or the MS, to transmit signals with the minimum transmission power needed to maintain an SIR required for data exchange. However, when an MS located in the center area of the BS increases transmission power of its transmission signals, interference signals being applied to the neighboring BS in charge of a cell neighboring the cell where it is currently located are lower in strength. Therefore, the BS allows the MS to transmit signals with higher transmission power to improve reception quality, i.e., QoS, of transmission/reception signals. Accordingly, there is a need for a scheme of controlling transmission power for data exchange in the communication system in the manner described above.

In addition, the BS can reduce a Packet Error Rate (PER) of transmission/reception data by allowing the MS located in the center area of its own cell to transmit signals with higher transmission power, thereby reducing retransmission of packets due to reception failure of data and thus preventing waste of resources. By reducing the retransmission of packets, the BS can allocate the remaining resources to the MSs having a low channel quality and increase packet retransmission to the MSs having a low channel quality over the allocated channels, thereby improving performance of the communication system. Therefore, there is a need for a scheme of controlling transmission power in the communication system in the above-described manner.

SUMMARY OF THE INVENTION

An aspect of the present invention is to address at least the above problems and/or disadvantages and to provide at least the advantages described below. Accordingly, an aspect of the present invention is to provide a method and system for controlling power in a communication system.

Another aspect of the present invention is to provide a method and system for controlling transmission power of an uplink in a communication system.

According to one aspect of the present invention, a method for controlling power in a communication system is provided. The power control method by a base station includes calculating a first offset according to traffic information of a mobile station and data transmission channel quality information of the mobile station, determining a second offset according to received channel quality information of the mobile station, received from the mobile station, determining a third offset according to interference information received from neighboring base stations, and transmitting, to the mobile station, power control information determined based on the first offset, the second offset and the third offset.

According to another aspect of the present invention, a system for controlling power in a communication system is provided. The power control system includes a base station for calculating a first offset according to traffic information of a mobile station and data transmission channel quality information of the mobile station, determining a second offset according to received channel quality information of the mobile station, received from the mobile station, determining a third offset according to interference information received from neighboring base stations, and transmitting, to the mobile station, power control information determined based on the first offset, the second offset and the third offset.

According to further aspect of the present invention, a system for controlling power in a communication system is provided. The power control system includes a base station including a power controller for calculating a first offset according to traffic information of a mobile station and data transmission channel quality information of the mobile station, for determining a second offset according to received channel quality information of the mobile station, received from the mobile station, for determining a third offset according to interference information received from neighboring base stations, and for determining power control information according to the first offset, the second offset and the third offset, wherein the base station transmits the determined power control information to the mobile station.

BRIEF DESCRIPTION OF THE DRAWINGS

The above and other aspects, features and advantages of the present invention will become more apparent from the following detailed description of certain exemplary embodiments when taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
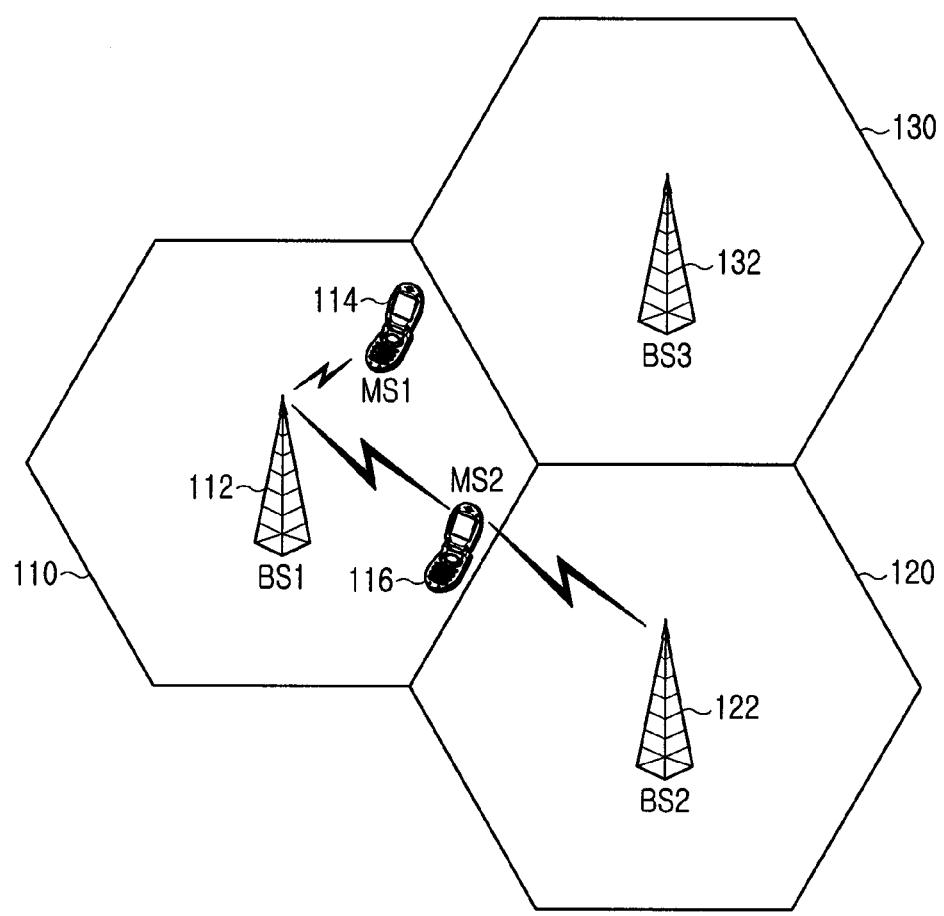
FIG. 1 is a schematic diagram illustrating a configuration of a communication system according to the present invention.

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provide a method and system for controlling power in a communication system, for example, an Institute of Electrical and Electronics Engineers (IEEE) 802.16 communication system, which is a Broadband Wireless Access (BWA) communication system. Although exemplary embodiments of the present invention will be described herein with reference to an IEEE 802.16e communication system employing Orthogonal Frequency Division Multiplexing (OFDM)/Orthogonal Frequency Division Multiple Access (OFDMA), by way of example, the power control method and system provided in the present invention can also be applied to other communication systems.

In addition, the present invention provide a method and system for controlling power when a communication system exchanges data between a Base Station (BS) in charge of a particular cell and a Mobile Station (MS) that is located in the cell and receives a communication service from the BS. The exemplary embodiments of the present invention, described below, provide a method and system for controlling transmission power when a communication system employing OFDM/OFDMA performs uplink transmission, i.e., when an MS receiving a communication service from a BS in charge of a particular cell transmits data to the BS.

Further, the present invention provides a method and system for controlling power of an uplink in a communication system. The exemplary embodiments of the present invention, described herein, provide a method and system in which a BS in charge of a particular cell controls a transmission power level of an MS, using downlink channel information fed back from the MS located in its own cell, and interference information in an uplink, received from a neighboring BS in charge of a cell neighboring the particular cell in a communication system employing OFDM/OFDMA.

In exemplary embodiments of the present invention, described below, in a communication system, a BS controls transmission power of an MS according to (i) Channel Quality Information (CQI), for example, Signal-to-Interference and Noise Ratio (SINR) or Carrier-to-Interference and Noise Ratio (CINR), in an uplink, estimated based on signals received from MSs located in a particular cell, (ii) CQI, for example, SINR or CINR, in a downlink, transmitted by each of the MSs over a Channel Quality Information Channel (CQICH) allocated for transmission of channel quality information, and (iii) interference information of the uplink, transmitted via a backbone network from neighboring BSs in charge of cells neighboring the cell where the MS is currently located. Herein, as for the interference information of the uplink transmitted from the neighboring BSs via the backbone network, when the MS transmits a signal to the BS from which it receives a communication service, the signal transmitted by the MS is applied as an interference signal to the MSs that exchange data with the neighboring BSs, and information about the interference signal is referred to as interference information.

Further, in exemplary embodiments of the present invention, described below, the MS located in a particular cell can transmit signals without error even though it increases power of the transmission signals, if the MS is located far from a neighboring BS, or located close to the BS that is in charge of the particular cell and provides a communication service to the MS, i.e., located in the center area of the BS in charge of the particular cell. In this case, because an interference signal applied to the neighboring BS is lower in strength by the transmission power, the BS allows the MS to transmit signals with higher transmission power so that the power of the transmission signal may satisfy a required Packet Error Rate (PER), thereby reducing a reception error rate of packets due to a change in channel. Accordingly, exemplary embodiments of the present invention reduce a transmission error probability of packets as described above, thereby reducing retransmission for error packets and thus improving resource efficiency.

In other words, exemplary embodiments of the present invention apply different criteria for uplink power control according to channel quality determined depending on the location of MSs located in the particular cell managed by the BS, thereby improving quality of transmission signals in the uplink of the MS located in the center area of the BS and thus reducing a probability of packet reception error, which may occur due to a change in wireless channel. Meanwhile, the channels allocated for retransmission for error packets to the MSs located in the center area of the BS are allocated to the MSs located in the boundary area of the BS, thereby increasing packet retransmission of the MSs located in the boundary area over the allocated channels and thus improving performance of the communication system.

Power control schemes used in the communication system can be classified into a downlink (forward) power control scheme and an uplink (reverse) power control scheme according to the direction of power control, and can be classified into an open-loop power control scheme and a closed-loop power control scheme according to whether a transmitter, or a BS, can receive feedback information from a receiver, or a MS.

In the downlink power control scheme, power control is performed in the BS. When the channel condition is good because the distance between the BS and the MS is short, the MS is located in the center area of the BS, or there is no shadowing due to obstacles, the BS allows the MS to transmit signals with the minimum possible transmission power, thereby reducing interference in neighboring BSs. When the channel condition is poor, the BS increases power of transmission signals within an allowable range so that the MS may normally receive the transmission signals from the BS. In the uplink power control scheme, power control is performed in the MS. The MS serves as a transmitter and the BS serves as a receiver, and they control power in the same manner as in the downlink power control scheme.

In the open-loop power control scheme, a transmitter (BS or MS) performing power control independently determines the channel quality of a receiver, and performs power control depending on the channel quality, and the open-loop power control scheme controls power based on reversibility between downlink and uplink channels. Herein, the reversibility between downlink and uplink channels' means that the MSs having the same (or similar) location against the BS will experience similar path attenuation due to the similar path attenuation based on distance between the BS and the MS, which determines the channel quality, the similar antenna gain based on antenna patterns, the similar shadowing effect caused by topology, the similar multi-path fading, etc. That is, in the open-loop power control scheme, based on the reversibility between downlink and uplink channels, the transmitter estimates the signal reception quality of the receiver, calculates required transmission power based on the estimated signal reception quality, and then transmits signals with the calculated transmission power.

In the closed-loop power control scheme, unlike in the open-loop power control scheme, the transmitter controls required transmission power based on signal reception quality of the receiver from which it has received a feedback channel, without independently determining the channel quality. The closed-loop power control scheme introduces undesirable, additional overhead for the feedback channel. However, because the transmitter can acquire information regarding the channel quality at the receiver, the closed-loop power control scheme can accurately control power of the transmission signal, compared to the open-loop power control scheme. With reference to FIG. 1, a description will now be made of a system for controlling power in a communication system according to the present invention.

FIG. 1 is a schematic diagram illustrating a configuration of a communication system according to the present invention.

Referring to FIG. 1, the communication system has a multi-cell configuration, i.e., has a cell #1 110, a cell #2 120 and a cell #3 130, and includes a BS1 112, a BS2 122 and a BS3 132 in charge of cells 110, 120 and 130, respectively, and an MS1 114 and an MS2 116, which are located in the cell #1 110 and receive communication services from the BS1 112. Herein, the MSs, i.e., the MS1 114 and the MS2 116, may be mobile or stationary. For convenience, it will be assumed that the MS1 114 is located in the center area of the cell #1 110, or the center area of the BS1 112, i.e., is located close to the BS1 112, and the MS2 116 is located in the boundary area of the cell #1 110, or the boundary area of the BS1 112, i.e., is located far from the BS1 112. In addition, signal exchange between the BSs 112, 122 and 132, and the MSs 114 and 116 located in the cells 110, 120 and 130 is assumed to be achieved using OFDM/OFDMA.

The MS 1 114, as it is located close to the BS 1 112 as described above, suffers from low path attenuation compared to other MSs, for example, the MS2 116. Therefore, the MS1 114 and the BS1 112 exchange signals with low transmission power. The MS2 116, as it is located far from the BS1 112, suffers from high path attenuation compared to other MSs, for example, the MS1 114. Therefore, the MS2 116 and the BS 1 112 exchange signals with high transmission power. In uplink power control, the BS1 112 controls the MS1 114 and the MS2 116 to transmit signals with the minimum possible transmission power so that the received SINRs of the MS 1 114 and the MS2 116 are sufficient to maintain a target PER.

Figure 2:
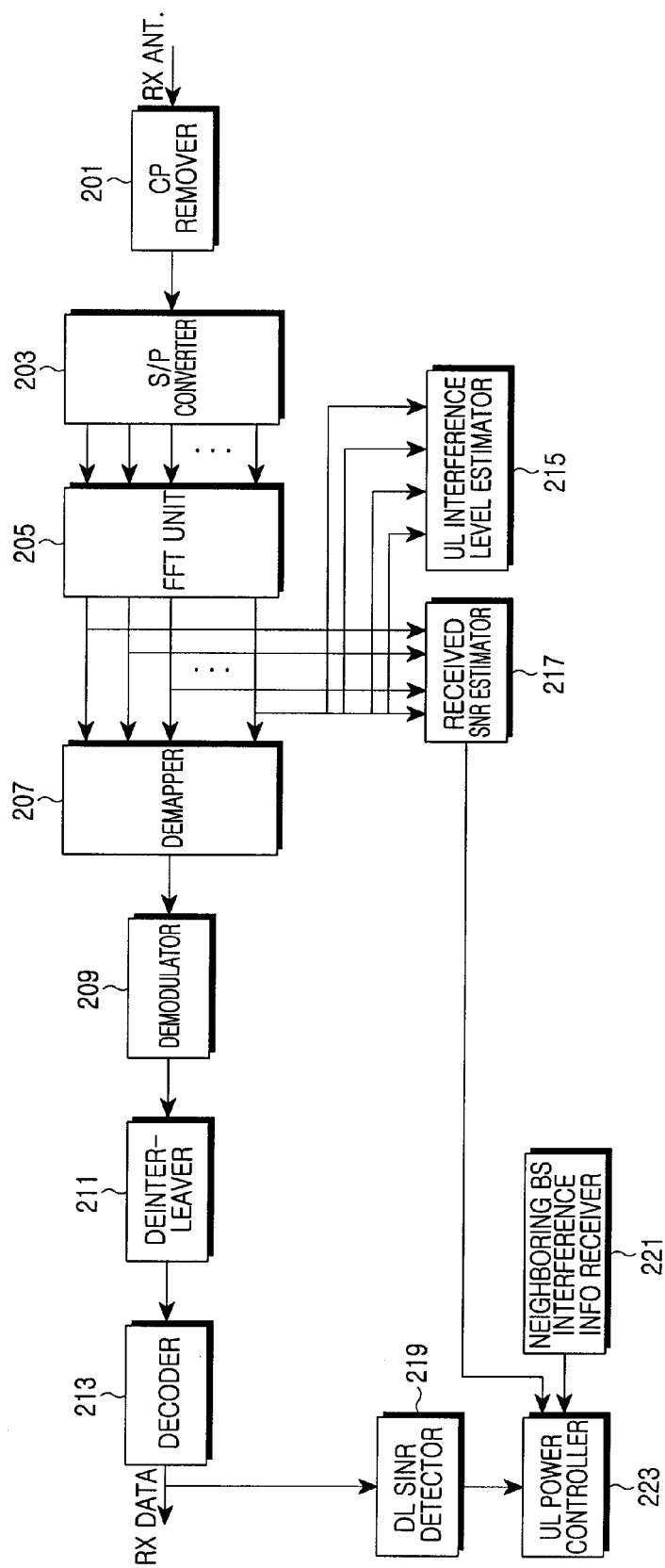
FIG. 2 is a block diagram illustrating a structure of a BS receiver for power control in a communication system according to the present invention.

Because the MS2 116 is located close to the BS2 122 in charge of the cell #2 120, if the BS1 112 allows the MS2 116 to transmit signals with high transmission power, interference signals applied to the BS2 122 are higher in strength because of the high transmission power. In contrast, because the MS1 114 is located far from the BSs 122 and 132 of neighboring cells 120 and 130, if the BS 1 112 allows the MS1 114 to transmit signals with high transmission power, interference signals applied to the neighboring BSs 122 and 132 are lower in strength even though a high transmission power is used. Therefore, the MS1 114, which has a high path attenuation because it is located far from the neighboring BSs, causes less interference even though the MS 1 114 transmits signals with high transmission power. Therefore, as described above, the BS1 allows the MS1 114 to transmit signals with higher transmission power so that the power of the transmission signals may satisfy the required PER, thereby reducing a transmission error probability of packets due to a change in channel. The reduction in transmission error probability of packets reduces retransmission for error packets, and improves resource efficiency. With reference to FIG. 2, a description will now be made of a BS receiver for power control in a communication system according to the present invention.

FIG. 2 is a block diagram schematically illustrating a structure of a BS receiver for power control in a communication system according to the present invention.

Referring to FIG. 2, the receiver of a BS includes a reception antenna RX_Ant for receiving signals transmitted from a transmitter of an MS over a wireless channel, a Cyclic Prefix (CP) remover 201 for removing a CP included in the signal provided from the reception antenna, a Serial-to-Parallel (S/P) converter 203 for parallel-converting the signal output from the CP remover 201, a Fast Fourier Transform (FFT) unit 205 for FFT-transforming the signal output from the S/P converter 203, a demapper 207 for demapping the signal output from the FFT unit 205 into a bit stream, a demodulator 209 for demodulating the signal output from the demapper 207, a deinterleaver 211 for deinterleaving the signal output from the demodulator 209, and a decoder 213 for decoding the signal output from the deinterleaver 211 and outputting received data RX_Data.

Further, the receiver includes a received Signal-to-Noise Ratio (SNR) estimator 217 for estimating a received SNR from the output signal of the FFT unit 205, an uplink interference level estimator 215 for estimating an interference level of the uplink from the output signal of the FFT unit 205, an detector 219 for detecting channel information, for example, SINR or CINR, of the downlink from the received data output from the decoder 213, an interference information receiver 221 for receiving interference information for neighboring BSs, transmitted via the backbone network, and a power controller 223 for controlling transmission power of the MS, i.e., uplink power, using the signals output from the received SNR estimator 217, the detector 219 and the interference information receiver 221.

When the MS transmits signals to the receiver of the BS, the uplink interference level estimator 215 estimates an interference level of an interference signal produced by the MSs that exchange data with the neighboring BSs, and then transmits interference information corresponding to the estimated interference level to the neighboring BSs via the backbone network. The received SNR estimator 217 estimates a received SNR, for example, SINR or CINR, as a CQI in the uplink, based on the signal received from the MS, i.e., the signal output from the FFT unit 205, and outputs the CQI in the uplink to the power controller 223. The detector 219 detects a CQI, for example, SINR or CINR, in the downlink, transmitted by the MS over a CQICH included in the received data output from the decoder 213, and outputs the detected CQI in the downlink to the power controller 223. The interference information receiver 221 receives interference information of the uplink, transmitted via the backbone network from the neighboring BSs in charge of cells neighboring the cell where the MS that transmits the signal the receiver has received is currently located, and then outputs the received interference information to the power controller 223.

Figure 3:
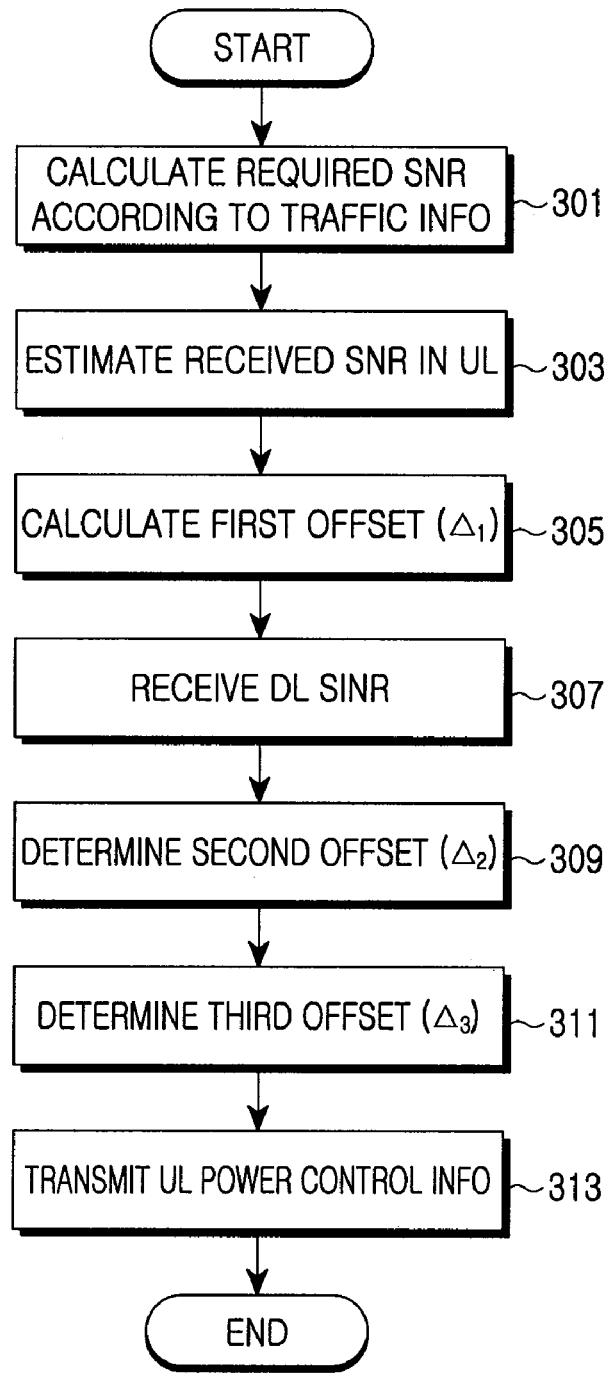
FIG. 3 is a flowchart illustrating a power control operation of a BS in a communication system according to the present invention.

Then the power controller 223 controls transmission power of the MS, i.e., uplink power, according to the information received from the received SNR estimator 217, the detector 219 and the interference information receiver 221, i.e., the uplink CQI, the downlink CQI, and the interference information of the neighboring BSs, and then transmits the resulting power control information to the MS. The power controller 223 controls the uplink power not only according to the received information, i.e., the uplink CQI, the downlink CQI, and the interference information of the neighboring BSs, but also according to traffic information of the MSs, delivered from an upper layer, for example, Modulation and Coding Scheme (MCS) information of the transmission data, and then transmits the power control information to the MSs over a downlink frame every predetermined transmission period. With reference to FIG. 3, a description will now be made of a power control operation of a BS in a communication system according to the present invention.

FIG. 3 illustrates a power control operation of a BS in a communication system according to the present invention.

Referring to FIG. 3, in step 301, a power controller of the BS calculates a required SNR according to traffic information, for example, MCS information, of MSs delivered from an upper layer. Thereafter, in step 303, a received SNR estimator of the BS estimates, from an uplink, a received SNR, for example, SINR or CINR, as a CQI of the uplink using the signals received from the MSs, and then outputs the received SNR to a power controller. At this point, an interference level estimator of the BS estimates an interference level in the uplink, for example, a level of an interference signal, by detecting an interference signal except for the desired signal from all signals received from the MSs. If a level of the estimated interference signal is less than a first threshold, the interference level estimator determines that the interference level is low, and if the level of the estimated interference signal is greater than the first threshold, the interference level estimator determines that the interference level is high. The interference level estimator transmits interference information corresponding to the determination result to the neighboring BSs via the backbone network.

In step 305, the power controller of the BS calculates a first offset A1 using the required SNR calculated in step 301 and the received SNR received in step 303 from the received SNR estimator. The first offset A1 is the difference between the required SNR and the received SNR.

Thereafter, in step 307, a detector of the BS detects a CQI, for example, SINR or CINR, in the downlink, transmitted by the MSs over a CQICH included in the data received from the MSs, and then outputs the detected downlink CQI to the power controller. At this time, the BS estimates quality of uplink channels of the MSs using the CQI estimated by each of the MSs and then transmitted over a CQICH, for example, using the downlink SINR. In other words, if the SINR transmitted from each of the MSs is high, it means that path attenuation with the BS that provides a communication service to the corresponding MS is low, and path attenuation with the interference BS (or neighboring BS) is high. For example, the high downlink SINR can be determined using Equation (1).

$$DL\,SINR = \frac{L_{s,m}S_m}{\sum_{i \neq s} L_{i,m}I_i + N_0} \quad (1)$$

In Equation (1), $S_m$ denotes a signal that an $m^{th}$ MS receives from a BS, $I_i$ denotes an interference signal from an $i^{th}$ BS, $L_{s,\,m}$ denotes a reciprocal of a downlink path attenuation between an $s^{th}$ BS and an $m^{th}$ MS, $L_{i,\,m}$ denotes a reciprocal of a downlink path attenuation between an $i^{th}$ BS and an $m^{th}$ MS, and $N_0$ denotes noise power. Meanwhile, an uplink SINR of an $n^{th}$ MS located in a $q^{th}$ neighboring BS other than the BS that provides a communication service to the corresponding MS, can be expressed as Equation (2).

$$UL\,SINR = \frac{L'_{q,n}S'_n}{\sum_{k}\sum_{i \neq n, i \neq m}(L'_{k,i}I'_i) + L'_{q,m}S'_m + N_0} \quad (2)$$

In Equation (2), $L'_{q,\,n}$ denotes a reciprocal of an uplink path attenuation between a $q^{th}$ BS and an $n^{th}$ MS, $L'_{k,\,i}$ denotes a reciprocal of an uplink path attenuation between a $k^{th}$ BS and an $i^{th}$ MS, and $L'_{q,\,m}$ denotes a reciprocal of an uplink path attenuation between a $q^{th}$ BS and an $m^{th}$ MS. Here, $L_{s,\,m}$ and $L'_{q,\,m}$ are inversely proportional to each other, because it means that if the $m^{th}$ MS is located close to the $s^{th}$ BS, the $m^{th}$ MS is located far from the $q^{th}$ BS. Therefore, it can be understood that if a downlink SINR of the $m^{th}$ MS is high, interference by the $m^{th}$ MS is low in an uplink SINR of a neighboring BS.

Therefore, for an MS having a high downlink SINR, path attenuation with a neighboring BS is greater than path attenuation with the BS that provides a communication service to the MS. Thus, the MS produces less interference in the neighboring BS. Since this MS produces less interference in the neighboring BS, if the BS allows the MS to transmit signals with higher transmission power by setting a higher margin for the required PER rather than restricting transmission power of the MS to a low limit, it can reduce error probability of packets as described above.

In step 309, the power controller of the BS determines a second offset Δ2 in a predetermined look-up table according to the downlink CQI received in step 307 from the detector and the traffic information, for example, MCS information, delivered in step 301 from the upper layer. Here, the second offset Δ2 has a greater value, as an MCS level of data traffic is higher, i.e., as modulation order and coding rate are higher, and as a downlink SINR is higher, i.e., as channel quality of the downlink is higher.

Thereafter, in step 311, the power controller of the BS receives, from the interference information receiver, interference information of the uplink that the interference information receiver of the BS has received from the neighboring BSs via the backbone network, and determines a third offset Δ3 according to the received interference information of the uplink. If an uplink interference level included in the interference information of the uplink is low, the power controller increases the third offset Δ3 because interference in the neighboring BSs is low in level even though transmission power of the MS is set high. However, if the uplink interference level included in the interference information of the uplink is high, the power controller decreases the third offset Δ3 because interference in the neighboring BSs is high in level when transmission power of the MS is set high.

In step 313, the power controller of the BS determines an offset for uplink power control using the first to third offsets Δ1, Δ2 and Δ3 calculated in steps 305, 309 and 311, i.e., by summing the first to third offsets Δ1, Δ2 and Δ3, and then transmits uplink power control information with the determined offset to the MSs. In this case, the power controller transmits the offset determined using the first to third offsets Δ1, Δ2 and Δ3 to the MSs as the uplink power control information. Alternatively, the power controller compares the determined offset with a second threshold, processes 1-bit information on increment/decrement in the transmission power, and transmits the resulting information to the MSs.

Upon receipt of the uplink power control information from the BS, the MS transmits signals with the current transmission power and new transmission power obtained using the offset included in uplink power control information beginning from the frame following the frame where the uplink power control information was transmitted. If a level of the new transmission power is higher than the maximum transmission power of the MS, the MS transmits signals with the maximum transmission power. In the latter case where the BS compares the uplink power control information with the second threshold, processes 1-bit information on increment/decrement in the transmission power, and transmits the resulting information to the MSs, the MS transmits signals with the new transmission power determined by increasing or decreasing the current transmission power according to increment/decrement information included in the uplink power control information, i.e., according to a level of the increment/decrement. In this case, if the new transmission power is greater than the maximum transmission power of the MS, the MS transmits signals with the maximum transmission power. However, if the new transmission power is less than predetermined minimum transmission power, the MS transmits signals with the minimum transmission power.

As is apparent from the foregoing description, according to the present invention, the BS applies different criteria for uplink power control according to channel quality determined based on the location of MSs located in the particular cell managed by the BS, thereby improving the quality of transmission signals in the uplink of the MS located in the center area of the BS and thus reducing a probability of packet reception error, which may occur due to a change in wireless channel. In addition, the BS allocates, to the MSs located in the boundary area of the BS, the channels allocated for retransmission for error packets to the MSs located in the center area of the BS, thereby increasing packet retransmission over the allocated channels and thus improving performance of the communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling power at a base station in a communication system, the method comprising:
   calculating a first offset according to traffic information of a mobile station and uplink channel quality information of the mobile station;
   determining a second offset according to downlink channel quality information of the mobile station, received from the mobile station;
   determining a third offset according to interference information received from neighboring base stations; and
   transmitting, to the mobile station, power control information determined based on the first offset, the second offset and the third offset.

2. The method of claim 1, wherein the traffic information of the mobile station comprises Modulation and Coding Scheme (MCS) information of data to be transmitted to the mobile station.

3. The method of claim 1, wherein the uplink channel quality information of the mobile station comprises a received Signal-to-Noise Ratio (SNR) in an uplink over which the mobile station transmits data to the base station.

4. The method of claim 1, wherein the first offset comprises a difference between a required Signal-to-Noise Ratio (SNR) corresponding to traffic information of the mobile station and a received SNR in an uplink.

5. The method of claim 4, the calculation of a first offset further comprises estimating the received SNR using signals received from the mobile station.

6. The method of claim 4, wherein the required SNR is based on Modulation and Coding Scheme (MCS) information of data to be transmitted to the mobile station, included in the traffic information of the mobile station.

7. The method of claim 1, wherein the downlink channel quality information of the mobile station comprises a Signal-to-Interference and Noise Ratio (SINR) calculated by the mobile station in a downlink over which the base station transmits data to the mobile station.

8. The method of claim 7, wherein the second offset is determined according to the SINR calculated by the mobile station and Modulation and Coding Scheme (MCS) information of data to be transmitted to the mobile station, included in the traffic information of the mobile station, using a look-up table.

9. The method of claim 1, wherein the interference information received from the neighboring base stations comprises an interference level to the neighboring base stations by the mobile station in an uplink over which the mobile station transmits data to the base station.

10. The method of claim 1, wherein the power control information comprises a result value obtained by summing the first offset, the second offset and the third offset.

11. The method of claim 1, wherein the power control information comprises power increment/decrement information determined by comparing a predetermined threshold with a result value obtained by summing the first offset, the second offset and the third offset.

12. The method of claim 1, wherein the calculation of a first offset comprises estimating an interference level to the mobile station by neighboring base stations in an uplink over which the mobile station transmits data to the base station, and transmitting interference information including the estimated interference level to the neighboring base stations.

13. A system for controlling power in a communication system, the system comprising:
   a base station for calculating a first offset according to traffic information of a mobile station and uplink channel quality information of the mobile station, determining a second offset according to downlink channel quality information of the mobile station, received from the mobile station, determining a third offset according to interference information received from neighboring base stations, and transmitting, to the mobile station, power control information determined based on the first offset, the second offset and the third offset.

14. The system of claim 13, wherein the traffic information of the mobile station comprises Modulation and Coding Scheme (MCS) information of data to be transmitted to the mobile station.

15. The system of claim 13, wherein the uplink channel quality information of the mobile station comprises a received Signal-to-Noise Ratio (SNR) in an uplink over which the mobile station transmits data to the base station.

16. The system of claim 13, wherein the first offset comprises a difference between a required Signal-to-Noise Ratio (SNR) corresponding to traffic information of the mobile station and a received SNR in an uplink.

17. The system of claim 16, wherein the base station estimates the received SNR using signals received from the mobile station.

18. The system of claim 16, wherein the required SNR is based on Modulation and Coding Scheme (MCS) information of data to be transmitted to the mobile station, included in the traffic information of the mobile station.

19. The system of claim 13, wherein the downlink channel quality information of the mobile station comprises a Signal-to-Interference and Noise Ratio (SINR) calculated by the mobile station in a downlink over which the base station transmits data to the mobile station.

20. The system of claim 19, wherein the second offset is determined according to the SINR calculated by the mobile station and Modulation and Coding Scheme (MCS) information of data to be transmitted to the mobile station, included in the traffic information of the mobile station, using a look-up table.

21. The system of claim 13, wherein the interference information received from the neighboring base stations comprises an interference level to the neighboring base stations by the mobile station in an uplink over which the mobile station transmits data to the base station.

22. The system of claim 13, wherein the power control information comprises a result value obtained by summing the first offset, the second offset and the third offset.

23. The system of claim 13, wherein the power control information comprises power increment/decrement information determined by comparing a predetermined threshold with a result value obtained by summing the first offset, the second offset and the third offset.

24. The system of claim 13, wherein the base station estimates an interference level to the mobile station by neighboring base stations in an uplink over which the mobile station transmits data to the base station, and transmits interference information including the estimated interference level to the neighboring base stations.

25. A system for controlling power in a communication system, the system comprising:
a base station including a power controller for calculating a first offset according to traffic information of a mobile station and uplink channel quality information of the mobile station, for determining a second offset according to downlink channel quality information of the mobile station, received from the mobile station, for determining a third offset according to interference information received from neighboring base stations, and for determining power control information according to the first offset, the second offset and the third offset;
wherein the base station transmits the determined power control information to the mobile station.

26. The system of claim 25, wherein the traffic information of the mobile station comprises Modulation and Coding Scheme (MCS) information of data to be transmitted to the mobile station.

27. The system of claim 25, wherein the base station comprises an estimator for estimating the uplink channel quality information of the mobile station, wherein the estimator estimates a received Signal-to-Noise Ratio (SNR) in an uplink over which the mobile station transmits data to the base station, and then transmits to the power controller the uplink channel quality information including the estimated received SNR.

28. The system of claim 25, wherein the power controller calculates, as the first offset, a difference between a required Signal-to-Noise Ratio (SNR) corresponding to the traffic information of the mobile station and a received SNR in an uplink.

29. The system of claim 28, wherein the base station estimates the received SNR using signals received from the mobile station.

30. The system of claim 28, wherein the required SNR is based on Modulation and Coding Scheme (MCS) information of data to be transmitted to the mobile station, included in the traffic information of the mobile station.

31. The system of claim 25, wherein the base station includes an detector for detecting the downlink channel quality information of the mobile station, included in data received from the mobile station, wherein the detector transmits to the power controller the downlink channel quality information calculated by the mobile station in a downlink over which the base station transmits data to the mobile station.

32. The system of claim 31, wherein the downlink channel quality information comprises a Signal-to-Interference and Noise Ratio (SINR).

33. The system of claim 32, wherein the power controller determines the second offset according to the SINR calculated by the mobile station and Modulation and Coding Scheme (MCS) information of data to be transmitted to the mobile station, included in the traffic information of the mobile station, using a look-up table.

34. The system of claim 25, wherein the base station further includes an interference information receiver for receiving interference information from the neighboring base stations.

35. The system of claim 34, wherein the interference information comprises an interference level to the neighboring base stations by the mobile station in an uplink over which the mobile station transmits data to the base station.

36. The system of claim 25, wherein the power controller transmits to the mobile station the power control information including a result value obtained by summing the first offset, the second offset and the third offset.

37. The system of claim 25, wherein the power controller transmits to the mobile station the power control information including power increment/decrement information determined by comparing a predetermined threshold with a result value obtained by summing the first offset, the second offset and the third offset.

38. The system of claim 25, wherein the base station includes an estimator for estimating an interference level to the mobile station by the neighboring base stations in an uplink over which the mobile station transmits data to the base station, and for transmitting interference information including the estimated interference level to the neighboring base stations.

* * * * *